(12) United States Patent
Tyagi et al.

(10) Patent No.: US 8,503,657 B2
(45) Date of Patent: Aug. 6, 2013

(54) SYSTEM, METHOD AND APPARATUS FOR AUTHENTICATING AND PROTECTING AN IP USER-END DEVICE

(75) Inventors: Satyam Tyagi, Richardson, TX (US); Guru-Prasad Thodime-Venkata, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 897 days.

(21) Appl. No.: 12/603,236

(22) Filed: Oct. 21, 2009

(65) Prior Publication Data
US 2010/0107230 A1 Apr. 29, 2010

Related U.S. Application Data

(63) Continuation-in-part of application No. 12/028,781, filed on Feb. 8, 2008.

(60) Provisional application No. 60/888,765, filed on Feb. 8, 2007.

(51) Int. Cl.
*H04M 3/42* (2006.01)
*H04M 15/06* (2006.01)
*H04M 1/66* (2006.01)
*H04L 9/32* (2006.01)

(52) U.S. Cl.
USPC ............... 379/207.13; 379/142.05; 455/411; 713/168

(58) Field of Classification Search
USPC .................. 379/90.02, 93.02, 142.05, 90.01, 379/93.03, 142.04, 167.06, 207.02, 207.11, 379/207.13; 455/411; 713/155, 168
See application file for complete search history.

(56) References Cited

U.S. PATENT DOCUMENTS

| | | | |
|---|---|---|---|
| 6,363,065 B1 | 3/2002 | Thornton et al. | |
| 6,542,601 B1* | 4/2003 | Hernandez et al. | 379/265.01 |
| 6,665,293 B2 | 12/2003 | Thornton et al. | |
| 6,757,823 B1 | 6/2004 | Rao et al. | |
| 6,842,449 B2 | 1/2005 | Hardjono | |
| 7,133,511 B2 | 11/2006 | Buntin et al. | |
| 7,171,460 B2 | 1/2007 | Kalavade et al. | |
| 7,310,813 B2 | 12/2007 | Lin et al. | |
| 7,613,923 B2 | 11/2009 | Gilchrist et al. | |
| 7,624,444 B2 | 11/2009 | Gupta et al. | |
| 7,889,646 B2 | 2/2011 | Wright | |
| 2002/0064149 A1 | 5/2002 | Elliott et al. | |

(Continued)

OTHER PUBLICATIONS

Official Action for U.S. Appl. No. 12/028,781, mailed Oct. 27, 2011 15 pages.

(Continued)

*Primary Examiner* — Khai N Nguyen
(74) *Attorney, Agent, or Firm* — Sheridan Ross P.C.

(57) ABSTRACT

A system, method and apparatus authenticates and protects an Internet Protocol (IP) user-end device by providing a client-based security software resident on the IP user-end device, authenticating the IP user-end device using the client-based security software and a network security node communicably coupled to the IP user-end device, authenticating a user of the IP user-end device whenever a trigger condition occurs using an in-band channel between the client-based security software and the network security node, and protecting the IP user-end device by: (a) screening incoming IP traffic to the IP user-end device using the client-based security software, and (b) detecting an attack or a threat involving the IP user-end device using the network security node.

22 Claims, 11 Drawing Sheets

U.S. PATENT DOCUMENTS

| | | |
|---|---|---|
| 2002/0129236 A1 | 9/2002 | Nuutinen |
| 2003/0043984 A1 | 3/2003 | Lauzon |
| 2004/0001579 A1* | 1/2004 | Feinberg et al. ............. 379/156 |
| 2004/0086093 A1 | 5/2004 | Schranz |
| 2004/0260560 A1 | 12/2004 | Holloway et al. |
| 2005/0132060 A1 | 6/2005 | Mo et al. |
| 2005/0180403 A1* | 8/2005 | Haddad et al. ................ 370/352 |
| 2005/0185639 A1* | 8/2005 | Lee et al. ..................... 370/352 |
| 2006/0036727 A1 | 2/2006 | Kurapati et al. |
| 2006/0229062 A1* | 10/2006 | Lai et al. ..................... 455/411 |
| 2007/0076853 A1 | 4/2007 | Kurapati et al. |
| 2007/0121596 A1* | 5/2007 | Kurapati et al. ............. 370/356 |
| 2008/0016334 A1 | 1/2008 | Kurapati et al. |
| 2008/0016515 A1 | 1/2008 | Naim et al. |
| 2008/0141284 A1* | 6/2008 | Tomizu ......................... 719/321 |
| 2008/0152098 A1 | 6/2008 | Paryzek et al. |
| 2009/0168756 A1 | 7/2009 | Kurapati et al. |

OTHER PUBLICATIONS

Official Action for U.S. Appl. No. 12/028,781, mailed Jun. 13, 2012 25 pages.

Stein, L.D. and Stewart, J.N., "The World Wide Web Security FAQ, Version 3.1.2, Feb. 4, 2002," http://www.w3.org/Security/Faq/.

Tyson, Jeff and Valdes, Robert, "How VoIP Works" http://computer.howstuffworks.com/ip-telephony.htm.

\* cited by examiner

Virtual IP Configuration :IPCS_OO1

| Protocol | Transport | VIP | Encapsulate VIP | Encapsulated VIP | IPCS IP | Remote IP | Add VIP Rule |
|---|---|---|---|---|---|---|---|
| Skinny | TCP | 172.16.181.10:2000 | Yes | Same as incoming | 172.16.181.10 | 10.10.0.5:2000 | |
| TFTP | UDP | 172.16.181.10:69 | No | NA | 172.16.181.10 | 10.10.0.5:2000 | |

SYSTEM, METHOD AND APPARATUS FOR AUTHENTICATING AND PROTECTING AN IP USER-END DEVICE

PRIORITY CLAIM

This patent application is a continuation-in-part patent application of U.S. patent application Ser. No. 12/028,781 filed on Feb. 8, 2008 and entitled "System, Method and Apparatus for Two Factor Authentication in VoIP Networks," which is a non-provisional application of U.S. provisional patent application 60/888,765 filed on Feb. 8, 2007 and entitled "System, Method and Apparatus for Two Factor Authentication in VoIP Networks," which is hereby incorporated by reference in its entirety.

FIELD OF THE INVENTION

The present invention relates generally to the field of telecommunications and, more particularly, to a system, method and apparatus for authenticating and protecting an Internet Protocol (IP) user-end device.

BACKGROUND OF THE INVENTION

The combination of device and user authentication is called "Two Factor" authentication. Enterprises already have this mechanism in place for remote users connecting through computers. RSA SecurID® or similar mechanism is the de facto way of enabling "two factor" authentication. Two Factor authentication requires a user to key in a special pass phrase or key that is displayed on a Secure Token. This token is typically issued by the company and is carried by the employee all the time. The token is linked back to token authentication server in the company. When the employee wants to login to corporate services, he/she must supply the pass phrase or key, which changes periodically, to ensure that only the employee is requesting the service. The supplied input data is validated against the authentication server and if the match occurs, the employee is granted the service. RSA tokens and RSA server are widely deployed two factor authentication mechanisms in corporations.

This above-mentioned technique works well for computer terminals as there are client applications built to accept the two factor authentication. There is, however, no client or user interface to allow two factor authentication on Internet Protocol (IP) user-end devices. Unlike traditional phones that are always tied to a physical wire connected to PBX/Switch, the new breed of IP user-end devices are IP enabled and thus provide portability and mobility. For example, an employee can carry an IP user-end device from his work and plug it into Ethernet connector at home and can access an entity's network. This flexibility enables businesses or other entities to deploy these phones to tele-workers, road warriors, consultants, partners and other. On the other hand, it makes these entities vulnerable to theft, attacks, and abuse.

Computers connected to an IP network are open to many forms of attacks and threats, such as DoS/DDoS floods, fuzzing/malformed messages, reconnaissance attacks, spoofing attacks, MIM attacks, stealth call attacks, rogue media, anomalous behavior, and/or SPAM. Similarly, IP user-end devices are vulnerable to these same types of attacks and threats. As a result, there is a need for a system, method and apparatus for authenticating and protecting an IP user-end device.

SUMMARY OF THE INVENTION

The present invention when applied in conjunction with deeper security threat mitigation creates a highly secure telephony that can be provided anywhere outside the corporation. As a result, entities can realize business continuity and the benefits of pervasive communications. The two factor authentication must be carried out in a secure channel between the IP user-end device and the entity as the IP user-end device is typically connected to the Internet. In addition, the voice conversation must be encrypted for privacy. With new IP user-end device terminals and soft phones this is typically achieved through encrypted transport. The present invention leverages the same control messages and voice prompts used for setting up calls to the phone to provide two factor authentication. Thus, an out-of-band channel is necessary to complete two factor authentication. Moreover, the present invention protects the IP user-end device by screening incoming IP traffic and detecting attacks or threat involving the IP user-end device.

The present invention provides a method for authenticating and protecting an Internet Protocol (IP) user-end device by providing a client-based security software resident on the IP user-end device, authenticating the IP user-end device using the client-based security software and a network security node communicably coupled to the IP user-end device, authenticating a user of the IP user-end device whenever a trigger condition occurs using an in-band channel between the client-based security software and the network security node, and protecting the IP user-end device by: (a) screening incoming IP traffic to the IP user-end device using the client-based security software, and (b) detecting an attack or a threat involving the IP user-end device using the network security node. Note that this process can be implemented using a computer readable medium executed by the processors wherein the steps are executed by one or more code segments.

In addition, the present invention provides an apparatus for authenticating and protecting an IP user-end device that includes a communications interface, a memory, and a processor communicably coupled to the communications interface and the memory. The processor is configured to run a client-based security software resident on the IP user-end device. The client-based security software and a network security node communicably coupled to the IP user-end device: (a) authenticate the IP user-end device, and (b) authenticate a user of the IP user-end device whenever a trigger condition occurs using an in-band channel between the client-based security software and the network security node. The client-based security software protects the IP user-end device by screening incoming IP traffic to the IP user-end device. The network security node protects the IP user-end device by detecting an attack or a threat involving the IP user-end device.

The present invention also provides a system that includes one or more IP user-end devices, a network security node, and an IP network communicably coupling the one or more IP user-end devices to the network security node. Each IP end-user device includes a first communications interface, a first memory, and a first processor communicably coupled to the first communications interface and the first memory wherein the first processor is configured to run a client-based security software resident on the IP user-end device. The network security node includes a second communications interface, a second memory, and a second processor communicably coupled to the second communications interface and the second memory. The client-based security software and the network security node: (a) authenticate the IP user-end device, and (b) authenticate a user of the IP user-end device whenever a trigger condition occurs using an in-band channel between the client-based security software and the network security node. The client-based security software protects the IP user-end device by screening incoming IP traffic to the IP user-end device. The network security node protects the IP user-end device by detecting an attack or a threat involving the IP user-end device.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 6 is screen shot of a virtual IP configuration table in accordance with one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to Voice over Internet Protocol (IP) technology (VoIP), but it will be understood that the concepts of the present invention are applicable to any Voice over IP application, or Unified Communication (UC) application such as Video calls, Presence, Instant Messaging, or any communication application that runs over IP.

The present invention when applied in conjunction with deeper security threat mitigation creates a highly secure telephony that can be provided anywhere outside the corporation. As a result, entities can realize business continuity and the benefits of pervasive communications. The two factor authentication must be carried out in a secure channel between the IP user-end device and the entity as the IP user-end device is typically connected to the Internet. In addition, the voice conversation must be encrypted for privacy. With new IP user-end device terminals and soft phones this is typically achieved through encrypted transport. The present invention leverages the same control messages and voice prompts used for setting up calls to the phone to provide two factor authentication. Thus, an out-of-band channel is necessary to complete two factor authentication. Moreover, the present invention protects the IP user-end device by screening incoming IP traffic and detecting attacks or threat involving the IP user-end device.

Figure 1A:
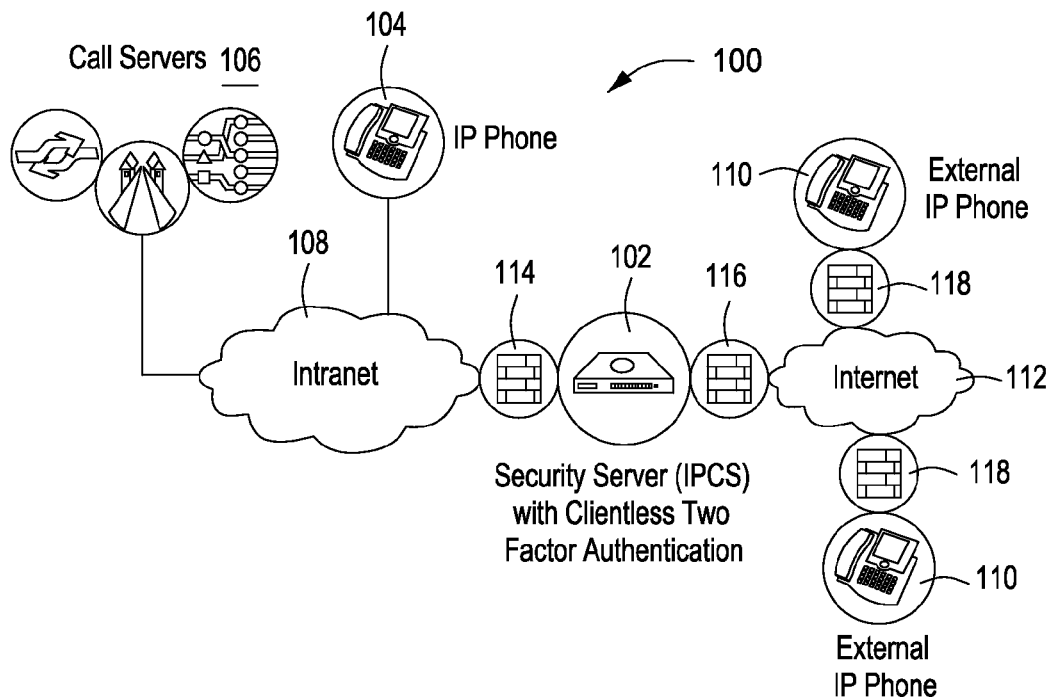
FIGS. 1A and 1B illustrate two network configurations in accordance with the present invention.
Figure 1B:
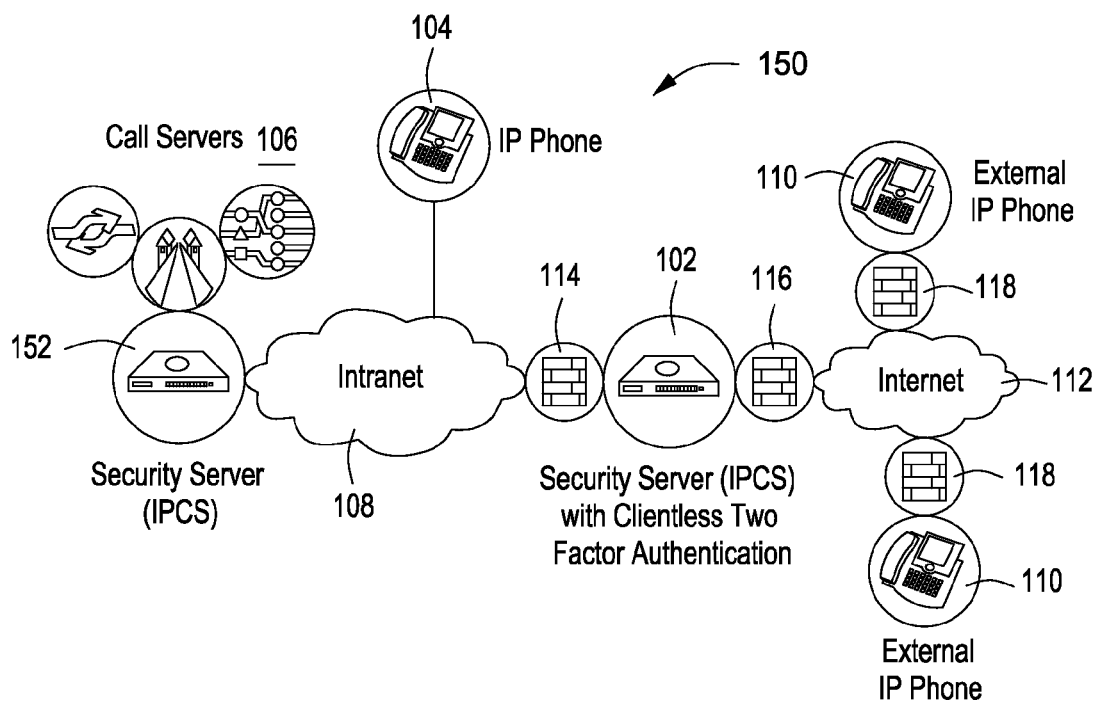

Now referring to FIGS. 1A and 1B, two network configurations in accordance with the present invention are illustrated. FIG. 1A represents the present invention in Internet Protocol Communication Security (IPCS) demilitarized zone (DMZ) mode 100. FIG. 1B represents the present invention in an IPCS in a tunnel mode 150. In either case, the present invention provides infrastructure and endpoint protection. The two factor authentication for remote users must be provided in the DMZ of enterprise. The security server 102 in the DMZ must be able to handle near-end and far-end firewall issues. The secrurity server 102 must: (a) provide authentication connectivity to the authentication server (not shown) (e.g., SecurID® server or other suitable authentication server); (b) terminate and inspect signaling and media; and (c) be a secure box. The security server (IPCS) 102 is communicably coupled to various IP user-end devices 104 and call servers 106 via an Intranet 108 or other IP-based communications network (internal, private or secure). Note that the security server 102 in FIG. 1B is communicably coupled to another security server 152, which is communicably coupled to the call servers 106, to establish a secure tunnel through the Intranet 108.

The security server 102 can be communicably coupled to various external IP user-end devices 110 via the Internet 112 or other IP-based communications network (external, less-secure or public). In addition, the security server 102 is protected by an internal firewall 114 and an external firewall 116. Similarly, external IP user-end devices 110 are protected by a firewall 118. The security server 102 includes a communications interface, a memory, and a processor communicably coupled to the communications interface and the memory. The processor is configured to perform the authentication processes described below. The IP user-end device 110 can be a dual mode phone, a wireless phone, a soft phone, a web phone, a personal data assistant or other IP-based telecommunications device that does not run a client-based authentication application during the authentication process described herein. Note that IP Private Branch Exchange (PBX) systems are not built to address the above requirements.

Figure 2:
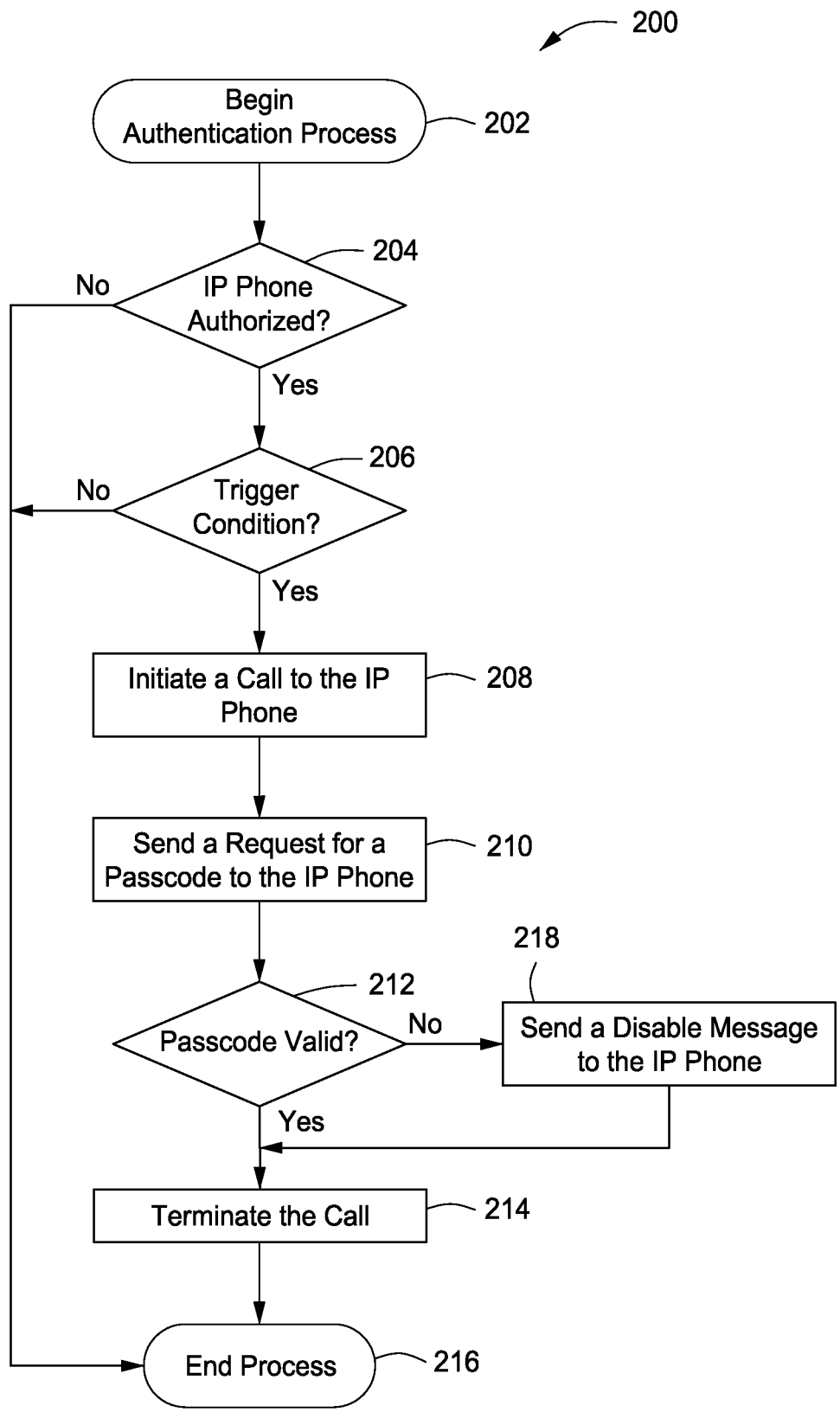
FIG. 2 is a flow chart illustrating a two factor authentication process in accordance with one embodiment of the present invention.

Referring now to FIG. 2, a flow chart illustrating a two factor authentication process 200 in accordance with one embodiment of the present invention is shown. The authentication process 200 begins in block 202. If the IP user-end device 110 is authorized, as determined in decision block 204, and a trigger condition occurs, as determined in decision block 206, the security server 102 initiates a call to the IP user-end device 110 in block 208. A "white list" or other type of commonly used device authentication can be used to authenticate the IP user-end device. The trigger condition can be a time-based condition, an event-based condition or a combination thereof. The time-based condition can be a requirement to authenticate the IP user-end device daily, weekly, bi-weekly, monthly, quarterly, yearly or some other specified time. The event-based condition can be receiving a registration request from the IP user-end device, a switch-over to standby, a challenge from an authentication manager, a request for a specified service, or a request for access to a specified device. If, however, the IP user-end device 110 is not authorized, as determined in decision block 204, or the trigger condition is not met, as determined in decision block 206, the process ends in block 216.

After the call is initiated, the secure server 102 sends a request for the user's passcode to the IP user-end device 110 in block 210. The request for the passcode may include one or more display prompts, one or more voice prompts or a combination thereof. The passcode can be a personal identification code, a token code, a physical key, an electronic key, a biometric identifier, a magnetic signature, an electronic signature, one or more numbers, one or more symbols, one or more alphabet characters, one or more keystrokes, or a combination thereof. If the passcode is valid, as determined in decision block 212, the call is terminated in block 214 and the process ends in block 216. If, however, the passcode is not valid, the security server 102 sends a message to the IP user-end device 110 that will disable the IP user-end device 110 in block 218. Thereafter, the call is terminated in block 214 and the process ends in block 216. After the authentication process 200 is successfully completed, the IP user-end device 110 will be allowed to access resources or connect to devices protected by the security server 102. Note that this process can be implemented using a computer readable medium executed by the secure server 102 wherein the steps are executed by one or more code segments.

Figure 3:
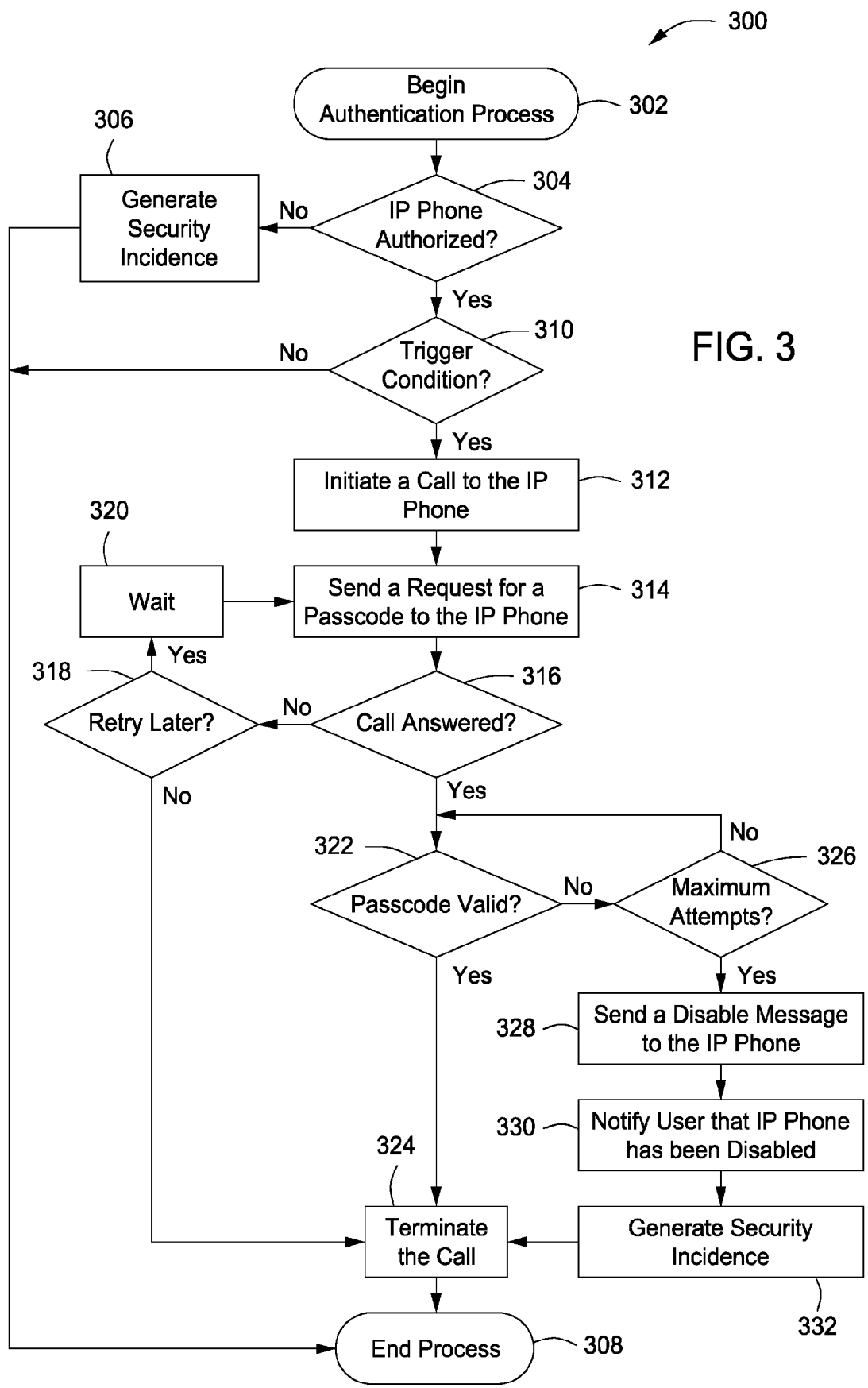
FIG. 3 is a flow chart illustrating a two factor authentication process in accordance with another embodiment of the present invention.

Now referring to FIG. 3, a flow chart illustrating a two factor authentication process 300 in accordance with another embodiment of the present invention is shown. The authentication process 300 begins in block 302. If the IP user-end device 110 is not authorized, as determined in decision block 304, a security incidence is generated in block 306 and the process ends in block 308. A "white list" or other type of commonly used device authentication can be used to authenticate the IP user-end device. If, however, the IP user-end device 110 is authorized, but a trigger condition does not occur (or is not satisfied), as determined in decision block 310, the process ends in block 308. The trigger condition can be a time-based condition, an event-based condition or a combination thereof. The time-based condition can be a requirement to authenticate the IP user-end device daily, weekly, bi-weekly, monthly, quarterly, yearly or some other specified time. The event-based condition can be receiving a registration request from the IP user-end device, a switchover to standby, a challenge from an authentication manager, a request for a specified service, or a request for access to a specified device If, however, the trigger condition is satisfied, the security server 102 initiates a call to the IP user-end device 110 in block 312.

After the call is initiated, the secure server 102 sends a request for the user's passcode to the IP user-end device 110 in block 314. The request for the passcode may include one or more display prompts, one or more voice prompts or a combination thereof. The passcode can be a personal identification code, a token code, a physical key, an electronic key, a biometric identifier, a magnetic signature, an electronic signature, one or more numbers, one or more symbols, one or more alphabet characters, one or more keystrokes, or a combination thereof. If the call is not answered, as determined in decision block 316, and request retries are allowed, as determined in decision block 318, the process waits in block 320 and a new request is sent in block 314. If, however, retries are not allowed, the call is terminated in block 324 and the process ends in block 308. If, however, the call is answered, as determined in decision block 316, and the passcode is valid, as determined in decision block 322, the call is terminated in block 324 and the process ends in block 308. If, however, the passcode is not valid, and the maximum number of attempts to enter the passcode have not been exceeded, as determined in decision block 326, the user may try to enter the correct passcode. If, however, the maximum number of attempts has been made, the security server 102 sends a message to the IP user-end device 110 that will disable the IP user-end device 110 in block 328, the user is notified that the IP user-end device 110 has been disabled in block 330. The notification may include one or more display messages, audio messages, voice mail messages, electronic mail messages, text messages, or a combination thereof. Thereafter, a security incidence is generated in block 332, the call is terminated in block 324 and the process ends in block 308. After the authentication process 300 is successfully completed, the IP user-end device 110 will be allowed to access resources or connect to devices protected by the security server 102.

The security server 102 can block any messages from the IP user-end device 110 until the IP user-end device 110 and the user are authenticated. In addition, the security server 102 can initiate another call to the IP user-end device 110 and send another request for a passcode to the IP user-end device 110 after the IP user-end device 110 has been disabled for a specified period of time. The security server 102 can delay registration of the IP user-end device 110 with a call manager until the IP user-end device 110 and the user are authenticated. Moreover, the IP user-end device 110 can be enabled after the IP user-end device 110 has been disabled by using a "clearing" process executed by the user, a technician, a security person, a supervisor or a combination thereof. Note that this process can be implemented using a computer readable medium executed by the secure server 102 wherein the steps are executed by one or more code segments.

Figure 4:
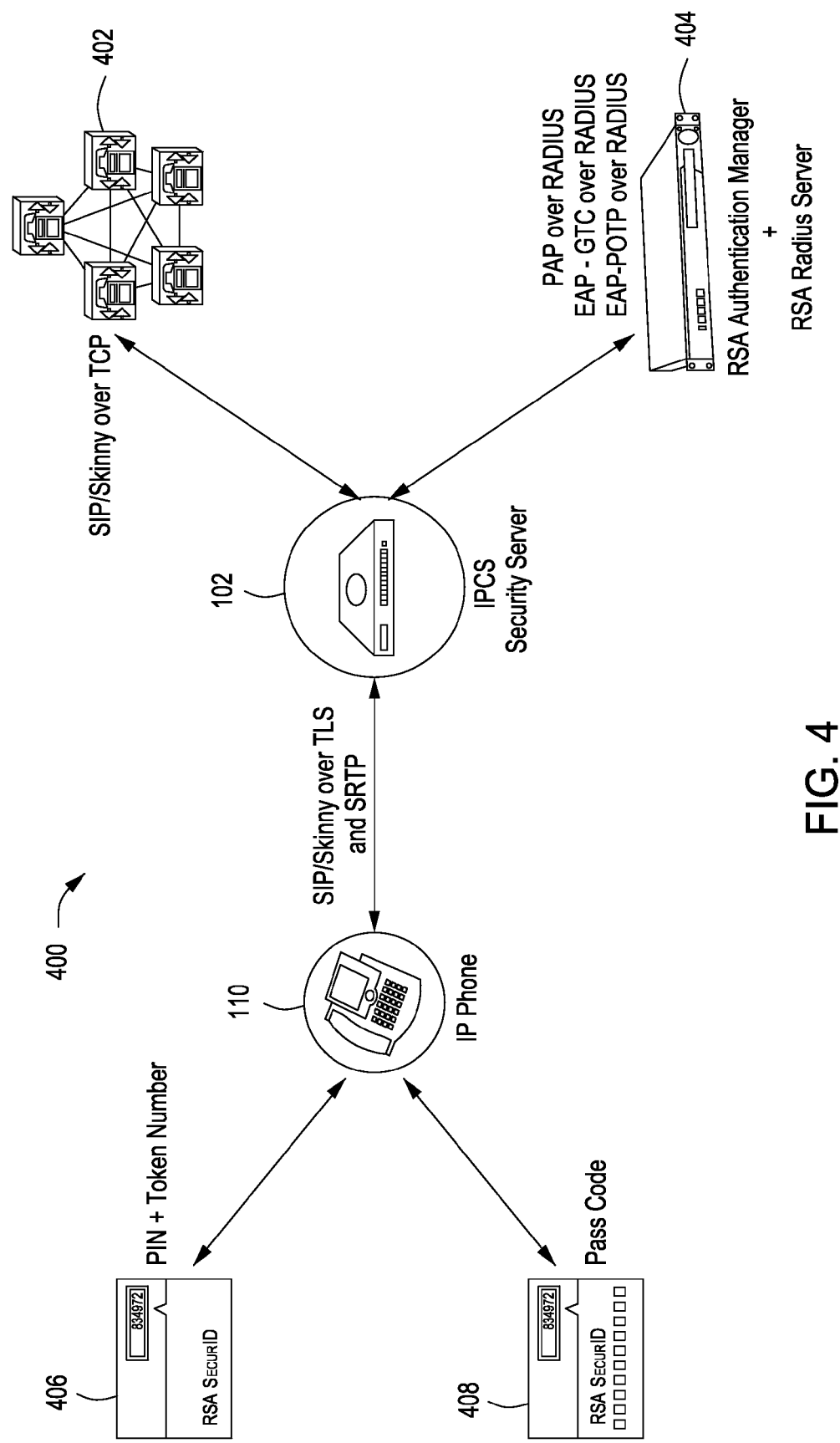
FIG. 4 illustrates a RSA SecurID® authentication network in accordance with one embodiment of the present invention.

Referring now to FIG. 4, a RSA SecurID® authentication network 400 in accordance with one embodiment of the present invention is illustrated. The system 400 includes a security server (IPCS) 102 communicably coupled to one or more protected resources, devices or phones 402 and an authentication server 404. The security server 102 is also communicably coupled to an IP user-end device 110. The user of the IP user-end device 110 has a RSA SecurID® 406 that provides a PIN+Token Number or RSA SecurID® with pinpad 408 that provides a Pass Code. The communication protocol used between the IP user-end device 110 and the security server 102 is SIP/Skinny over TLS and SRTP. The communication protocol used between the security server 102 and the protected phones 402 is SIP/Skinny over TCP. The communication protocol used between the security server 102 and the authentication server 404 (RSA Authentication Manager+RSA Radius Server) is PAP over RADIUS, EAP-GTC over RADIUS and/or EAP-POTP over RADIUS. The security server 102 can request authentication of the received passcode from the authentication server 404.

The present invention can implement any of the following pre-authentication rules:

1. Perform following operations for devices in the white list. Any requests from devices not in white list, they are blocked and a security incidence is generated.
2. Do not allow any messages from phone to Intranet before authentication completes.
3. Serve default configuration file using Trivial File Transfer Protocol (TFTP). If the local copy is not available, use a default file that is preconfigured.
4. When phone sends Registration Request, accept it and send the success response without any interaction with CCM network. (Register phone with some default values).
5. Ring the phone and request for SecurID® key using Display Prompt. If the user doesn't pickup the phone, then authentication should be done whenever user goes off-hook. The ring should stop after timeout 3 mins, but display and light can remain on, and when phone goes offhook the IPCS will request for passcode.

6. In the event Display prompt is not feasible with the protocol, IPCS shall request for the key using voice prompt.
7. Allow configurable number of consecutive failed-attempts to authenticate before locking the phone down.
8. If the phone is locked down, play the Lock down prompt. It should be both a display prompt and some tone. Audio is also possible.
9. Generate an incidence when the phone is locked down.
10. Use configurable timer to challenge the user to re-authenticate after locking down.
11. When the timer expires prompt for re-authentication only if the user goes off-hook. Request for secureid key using Display Prompt in the following cases:
    i. When the timer expires, ring the phone and display "Please go offhook to complete registration" don't request SecurID® passcode yet.
    ii. Whenever the user goes off-hook. Now IPCS can request SecurID® passcode.
12. If the SecurID® server rejects/challenges authentication request, IPCS shall use the prompt from "Reply-Message" attribute in the message. If prompt is too big to display a compressed format maybe used.
13. Lockdown clearing process: IPCS allows the ability to clear the lock down using "out-of-band" mechanism.
14. IPCS EMS will provide ability for help desk to login and clear the lock down.
15. In addition, IPCS will provide "Self-service" capability by providing Web Service using SOAP/XML to offer this capability and integrate with Enterprise Employee portal.
16. IPCS will display the portal URI on the phone when the user is locked down and procedure to clear it.

In addition, the following post-authentication rules can be used:
17. Once Authentication completes the phone will have same capabilities as it would have without IPCS.
18. The Re-Authentication of the phone will either be Time Based or Event based or both.
19. If it is Time based, Admin must specify either daily, weekly, bi-weekly or monthly.
20. If it is Event based Admin can select one or more events such as Phone sending Re-Registration Request, Call Manager switch-over to standby.

A RADIUS PAP RSA SecurID® Example flow is as follows:
Display Prompts on phone
To continue Phone Registration you must enter your PIN and Passcode.
1. sending Access-Request . . .
1. received Access-Challenge
You must select a new PIN. Do you want the system to generate your new PIN? (y/n) [n]
y
2. sending Access-Request . . .
2. received Access-Challenge
Enter a new PIN between 4 and 8 digits:
1234
3. sending Access-Request . . .
3. received Access-Challenge
Re-enter new PIN to confirm:
1234
4. sending Access-Request . . .
4. received Access-Challenge
PIN accepted. Wait for the tokencode to change, then enter a new PASSCODE:
1234169199
5. sending Access-Request . . .
5. received Access-Accept
OK Registration Complete
BackGround RADIUS Messages

---

Figure 5:
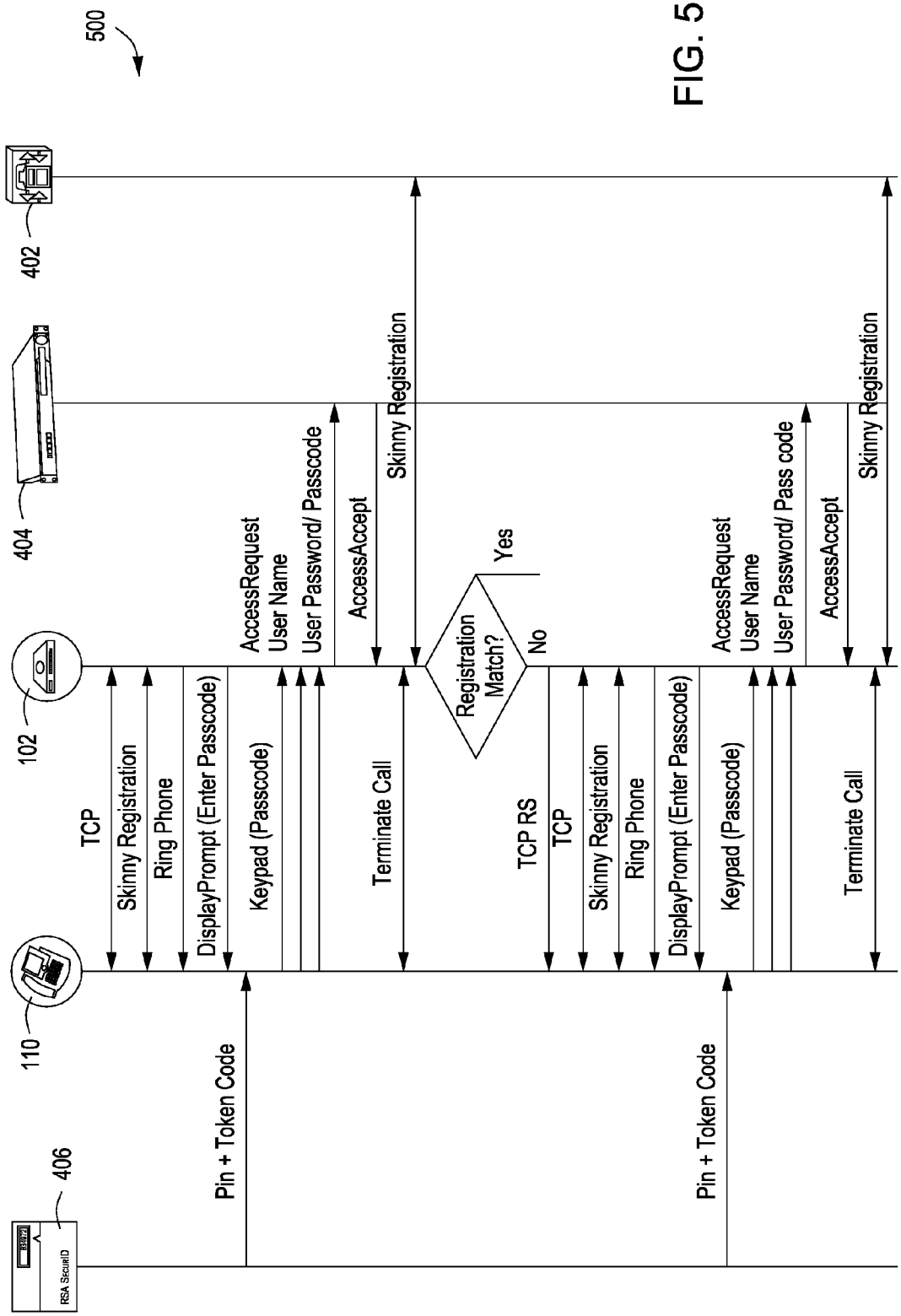
FIG. 5 is a call flow diagram in accordance with one embodiment of the present invention.

1. Code: Access-Request
Identifier: 182
Authentic: 1234567890123456
Attributes:
User-Name = "mikem"
Service-Type = Framed-User
NAS-IP-Address = 203.63.154.1
NAS-Port = 1234
Called-Station-Id = "123456789"
Calling-Station-Id = "987654321"
NAS-Port-Type = Async
User-Password=
    "<200><185>1<153><153>o4<199><142><10><9><160><216>}x<153>"
1. Code: Access-Challenge
Identifier: 182
Authentic: <143>R9<132>X<242><21><184>E<135>?#<9><189><11><228>
Attributes:
State = "SECURID=884099926"
Reply-Message = "You must select a new PIN. Do you want the
    system to generate your new PIN? (y/n) [n] "
2. Code: Access-Request
Identifier: 202
Authentic: 1234567890123456
Attributes:
User-Name = "mikem"
Service-Type = Framed-User
NAS-IP-Address = 203.63.154.1
NAS-Port = 1234
Called-Station-Id = "123456789"
Calling-Station-Id = "987654321"
NAS-Port-Type = Async User-Password=
    "<151><139>_<173><175>\<4><246><188>8<9><160><216>}x<153>"
State = "SECURID=884099926"
2. Code: Access-Challenge
Identifier: 202
Authentic:
    <156><131><25>j<212><154><153><193><201><152>WY?<208><164>d
Attributes:
State = "SECURID=884099926"
Reply-Message = "Enter a new PIN between 4 and 8 digits:"
3. Code: Access-Request
Identifier: 207
Authentic: 1234567890123456
Attributes:
User-Name = "mikem"
Service-Type = Framed-User
NAS-IP-Address = 203.63.154.1
NAS-Port = 1234
Called-Station-Id = "123456789"
Calling-Station-Id = "987654321"
NAS-Port-Type = Async
User-Password=
    "<200><185>1<153><175>\<4><246><188>8<9><160><216>}x<153>"
State = "SECURID=884099926"
3. Code: Access-Challenge
Identifier: 207
Authentic: <151><214>G<132>6S<134>ed<197>k<199>nK6<186>
Attributes:
State = "SECURID=884099926"
Reply-Message = "Re-enter new PIN to confirm: "
4. Code: Access-Request
Identifier: 208
Authentic: 1234567890123456
Attributes:
User-Name = "mikem"
Service-Type = Framed-User
NAS-IP-Address = 203.63.154.1
NAS-Port = 1234
Called-Station-Id = "123456789"
Calling-Station-Id = "987654321"
NAS-Port-Type = Async
User-Password=
    "<200><185>1<153><175>\<4><246><188>8<9><160><216>}x<153>"
State = "SECURID=884099926"
4. Code: Access-Challenge
Identifier: 208
Authentic: <192><189><30>D<150><211><140>&$Gdz<252><135>S<250>
Attributes:
State = "SECURID=884099926"
Reply-Message = "PIN accepted. Wait for the tokencode to change,
    then enter a new PASSCODE: "
5. Code: Access-Request
Identifier: 220
Authentic: 1234567890123456
Attributes:
User-Name = "mikem"
Service-Type = Framed-User
NAS-IP-Address = 203.63.154.1
NAS-Port = 1234
Called-Station-Id = "123456789"
Calling-Station-Id = "987654321"
NAS-Port-Type = Async
User-Password=
    "<200><185>1<153><158>o0<193><140><8><9><160><216>}x<153>"
State = "SECURID=884099926"
5. Code: Access-Accept
Identifier: 220
Authentic: <246>>'jM<173>s<17><214><217><220><219>[<243>D<220>
Attributes:

Now referring to FIG. 5, a call flow diagram 500 in accordance with another embodiment of the present invention is illustrated. The solution is described using the SKINNY protocol, but it can also apply to other protocols that are used to setup VoIP (Voice over IP) calls.

Referring now to FIG. 6, a screen shot of a virtual IP configuration table in accordance with one embodiment of the present invention is illustrated. For example, the following rules can be used:

21. IPCS will use VIP table to configure TFTP proxy rules.
22. The internal firewall should have a rule to allow TFTP port 69 to CCM from EIPCS (not necessary in tunnel mode).
23. IPCS will request file from random ports (50001, 50002, . . . ) to CCM port 69.
24. The CCM will send files from random port (51001, 51002, . . . ) to corresponding IPCS ports (50001, 50002, . . . ).
25. The external firewall should have a rule to allow TFTP port (69) to VIP address on IPCS.
26. The phone will request file from random ports (52001, 52002, . . . ) to IPCS port 69.
27. The IPCS will send file from "fixed port" 69 to corresponding phone ports (52001, 52002, . . . ).
    a. This way we can get around the far end firewall.
    b. IPCS needs to keep context on IP address, port basis.
28. The phones will be configured with alternate TFTP server in CCM such that they can transparently move in and out of the Enterprise without changing any configuration.

TFTP XML Rewriting

| XML TAG | Original IP | Rewrite IP |
|---|---|---|
| <callManagerGroup><br>  <members><br>    <members><br>      <callManager><br>        <processNodeName> | 10.10.100.10 | 192.168.10.30 |
| <callManagerGroup><br>  <members><br>    <members><br>      <callManager><br>        <processNodeName> | 10.10.100.11 | 192.168.10.31 |

```
    ...
    <callManagerGroup>
    <members>
    <member priority="0">
    <callManager>
    <ports>
    <analogAccessPort>2002</analogAccessPort>
    <digitalAccessPort>2001</digitalAccessPort>
    <ethernetPhonePort>2000</ethernetPhonePort>
    <mgcpPorts>
    <listen>2427</listen>
    <keepAlive>2428</keepAlive>
    </mgcpPorts>
    </ports>
    <processNodeName>10.10.100.10</processNodeName>
    </callManager>
    </member>
    <member priority="1">
    <callManager>
    <ports>
    <analogAccessPort>2002</analogAccessPort>
    <digitalAccessPort>2001</digitalAccessPort>
    <ethernetPhonePort>2000</ethernetPhonePort>
    <mgcpPorts>
    <listen>2427</listen>
    <keepAlive>2428</keepAlive>
    </mgcpPorts>
    </ports>
    <processNodeName>10.10.100.11</processNodeName>
    </callManager>
    </member>
    </members>
    </callManagerGroup>
    ...
```

29. IPCS will parse and modify the XML for the SEP<MAC>.cnf.xml in accordance with the TFTP rewriting configuration
30. The xml tags, current value and rewrite value will be configured.

Phone Behavior Analysis

Whenever Skinny Reset w DEVICE RESET message

Is received from call manager

Phone sends Un register message

CCM sends Un register ack message

CCM sends TCP reset

Phone requests config file

Phone receives config file

Phone Registers

Whenever Skinny Reset w DEVICE_RESTART message

Is received from call manager

Phone sends Un register message

CCM sends Un register ack message

CCM sends TCP reset

Phone Registers

Phone requests config file

Phone receives config file

When # on phone

Phone sends Un register message

CCM sends Un register ack message

CCM sends TCP reset

Phone requests config file

Phone receives config file

Phone Registers

When power cycle phone

Phone requests config file

Phone receives config file

Phone Registers

Phone requests config file again

Phone receives config file again

Ethernet connect disconnect

Phone Registers

Phone requests config file

Phone receives config file.

Figure 7:
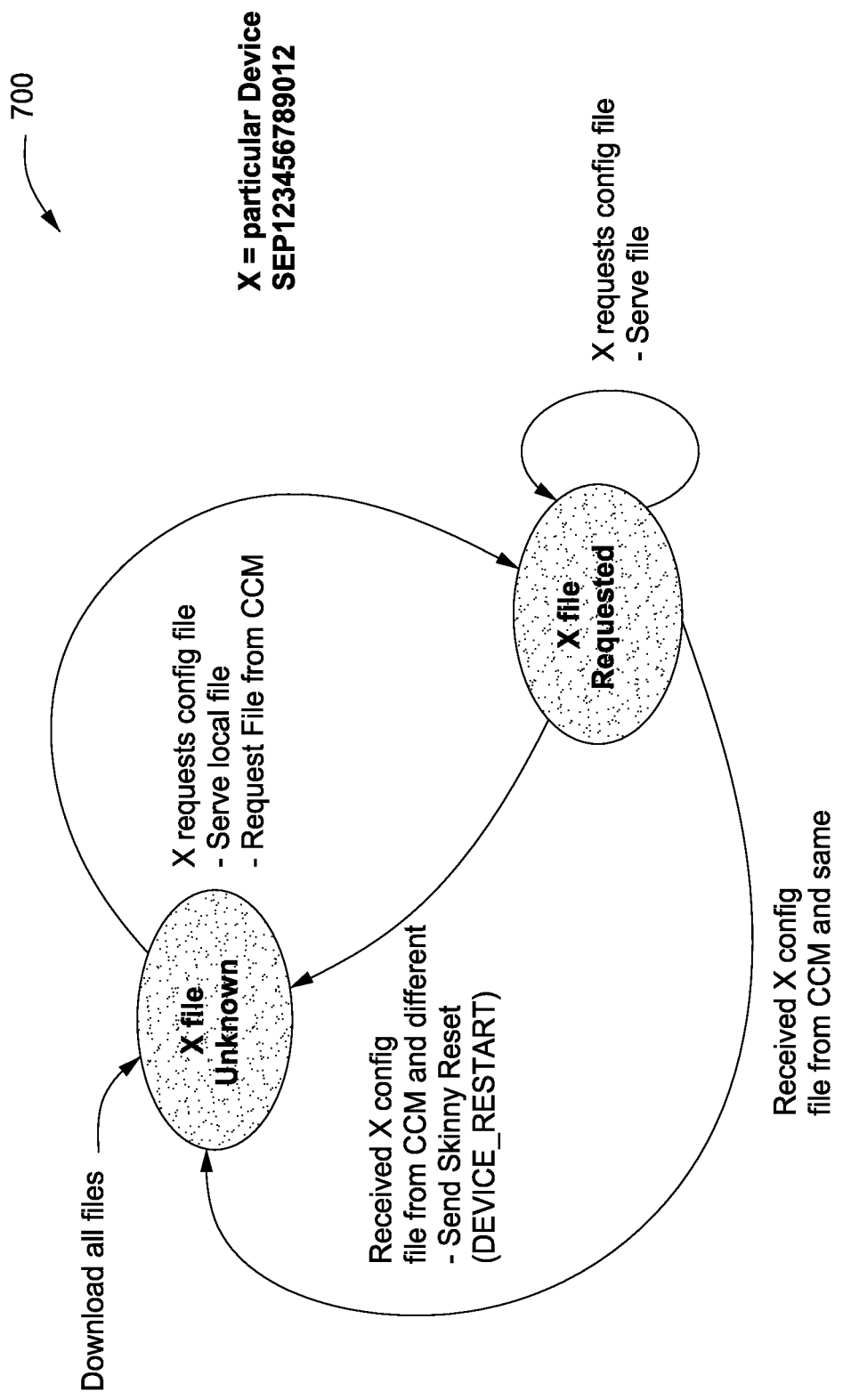
FIG. 7 is a state machine diagram in accordance with one embodiment of the present invention.

Now referring to FIG. 7, a state machine diagram 700 in accordance with one embodiment of the present invention is illustrated.

| Events->States | X requests config file | CCM serves file same | CCM serves file different |
|---|---|---|---|
| X File Unknown<br>Entry: – | Action: Serve local file<br>Request file from CCM<br>Next State: X File Requested | Not Possible | Not Possible |
| X File Requested<br>Entry: – | Action: Serve local file<br>Next State: Same | Action: None<br>Next State: X File Unknown | Action: Send Skinny Reset<br>(DEVICE_RESTART)<br>Next State: X File Unknown |

An IPCS TFTP Message Sequence is as follows:
31. Whenever phone requests file, IPCS will serve locally available file and IPCS will also request the same file from CCM.
32. Always on receiving the file from CCM. IPCS will check if the contents of file have changed from the current version on IPCS and then update the local file.
33. If the file obtained has been modified IPCS will send skinny reset with "DEVICE_RESTART" to phone to force it to update file.
   a. To identify the phone IPCS will rely on Device name in the file name SEP<MAC>.cnf.xml.
   b. To identify the phone in case of other files IPCS will rely on connection from same public IP, this will not handle the case of NAT.
34. If the file obtained is same as the local copy on IPCS, IPCS will do nothing.

Figure 8:
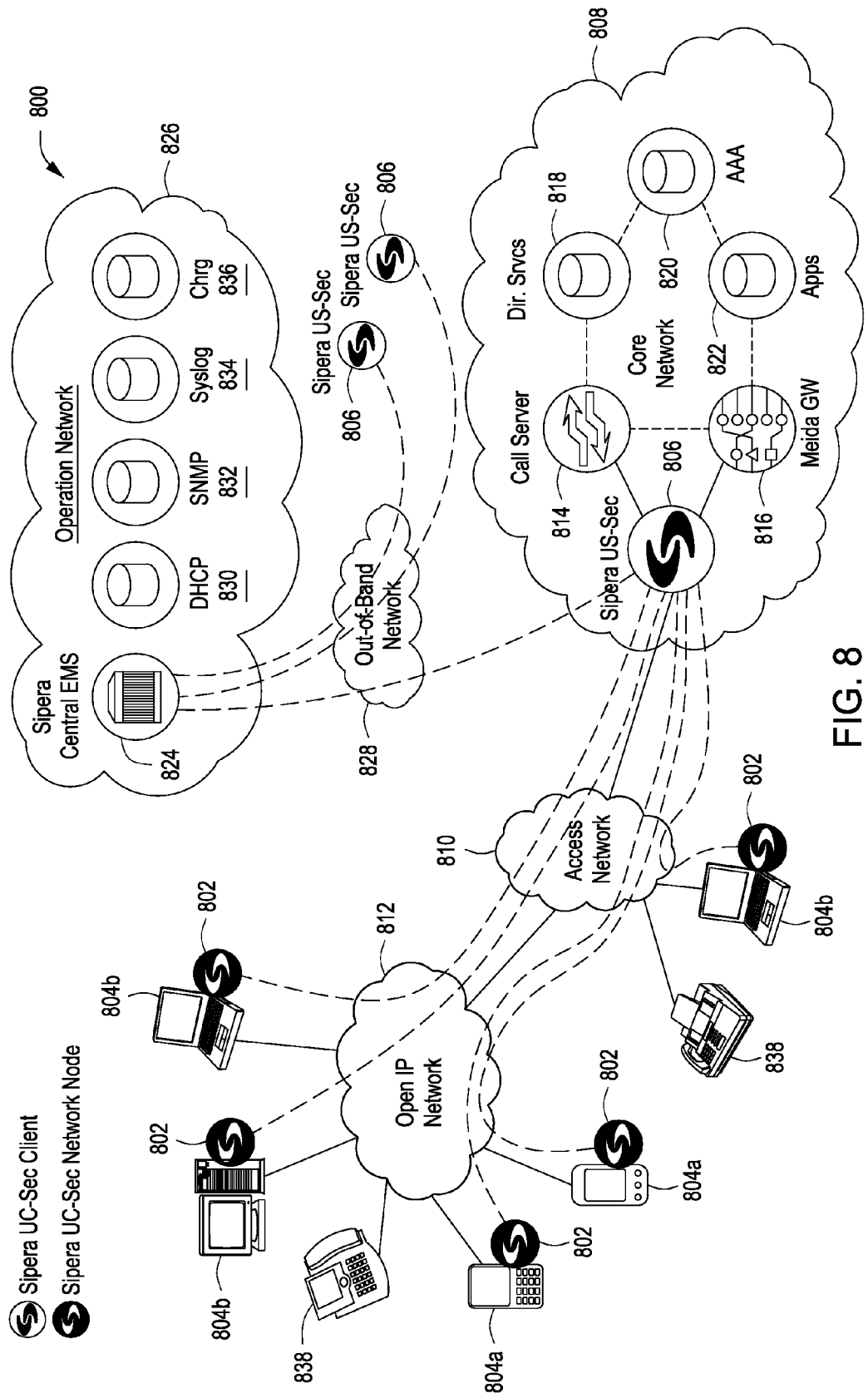
FIG. 8 is a network configuration in accordance with another embodiment of the present invention.

Referring now to FIG. 8, a network 800 configuration in accordance with another embodiment of the present invention is shown. The client-based security software 802 (e.g., Sipera UC-Sec Client application or plug-in) is installed on the IP user-end device 804 (e.g., a dual mode phone, a wireless phone 804a, a soft phone, a web phone, a personal data assistant, a computer 804b, or other IP-based telecommunications device). The network security node 806 (e.g., Sipera UC-Sec network node) is deployed in the core network 808 where it communicates with the client-based security software 802 on the IP user-end device 804 via an access network 810 and/or an open IP network 812. The network security node 806 is deployed in the DMZ of the associated Call Server 816 and Media Gateway 818 and will service any remote IP user-end device 804 that has the client-based security software 802 and is connecting to that DMZ. The Call Server 816 and Media Gateway 818 communicate with other devices or services within the core network 808 (e.g., Directory Services 818, Authentication, Authorization and Accounting (AAA) 820, Applications 822, etc.). All VoIP calls for the IP user-end device 804 operating remotely to the Enterprise will go through the network security node 806 deployed in the DMZ. A separate network security node (not shown) can also be deployed (upon customer need and request) inside the Enterprise to serve internal VoIP devices that have the client-based security software 802. The network security node 806 also communicates with the Back-office Network Operation Center 824 (e.g., Sipera Central EMS) in the operation network 826 via an out-of-band network 828. The operation network 826 typically also includes DHCP 830, SNMP 832, Syslog 834 and Chrg 836. The client-based security software 802 can apply to mobile phone devices with a Smart card, a Flex-SIM card, and user PC devices that have VoIP Soft-client. The client-based security software 802 does not apply to VoIP Hard phones 838.

Figure 9:
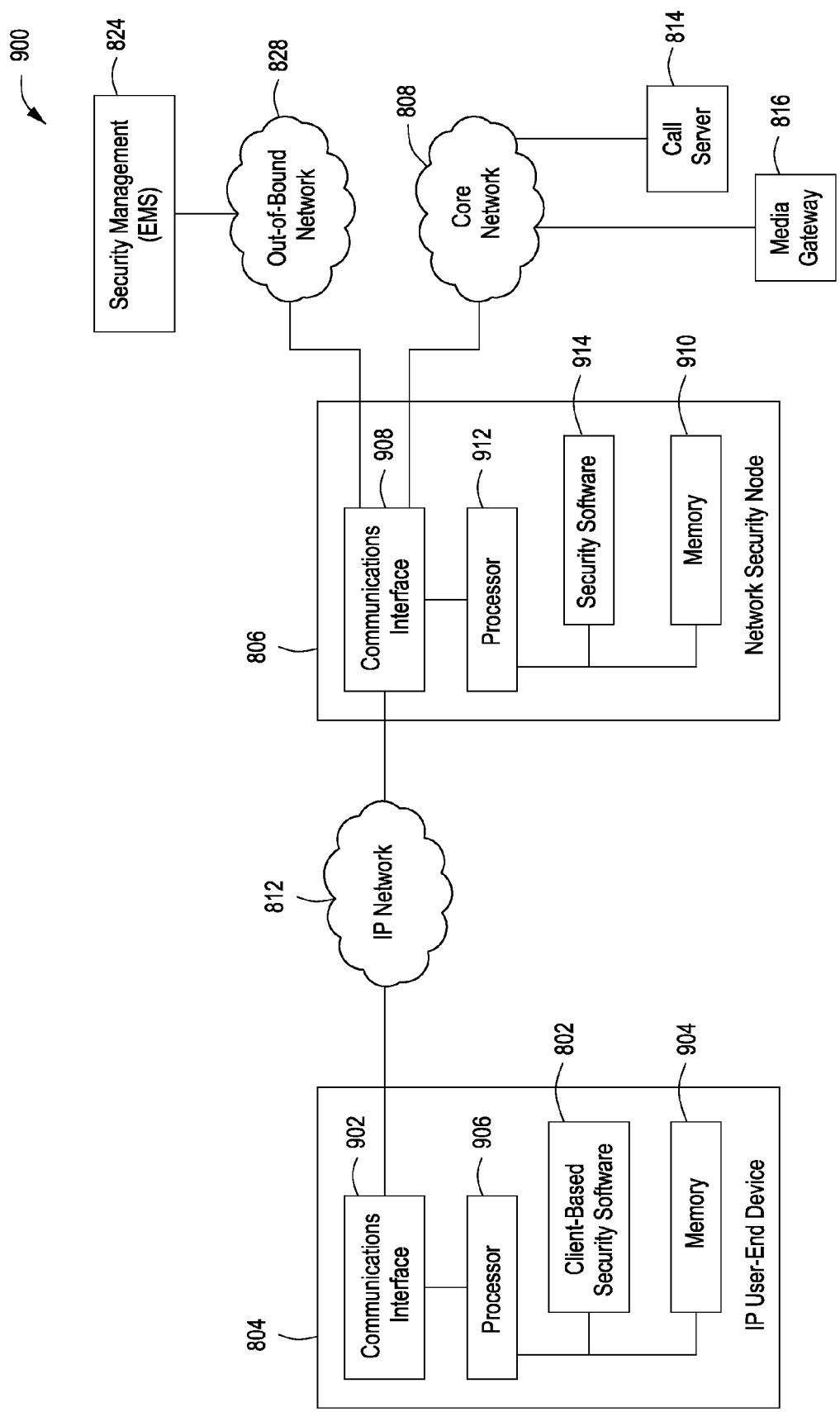
FIG. 9 is a block diagram of a system for authenticating and protecting an IP user-end device in accordance with another embodiment of the present invention.

Now referring to FIG. 9, a block diagram of a system 900 for authenticating and protecting an IP user-end device 804 in accordance with another embodiment of the present invention is shown. The system 900 includes one or more IP user-end devices 804 communicably coupled to a network security node 806 via an IP network 812. The network security node 806 is communicably coupled to a call server 814 and a media gateway 816 via a core network 808, and a security management center (EMS) 824 via an out-of-bound network 828. Each IP end-user device 804 includes a first communications interface 902, a first memory 904, and a first processor 906 communicably coupled to the first communications interface 902 and the first memory 904 wherein the first processor 906 is configured to run a client-based security software 802 resident on the IP user-end device 804. The IP user-end device 804 can be a dual mode phone, a wireless phone, a soft phone, a web phone, a personal data assistant, a computer, or other IP-based telecommunications device.

The IP user-end device 804 runs an IP-based application comprising a Voice over IP (VoIP) application, an Instant Messaging (IM) application, a Short Message Service (SMS) application, a video application, a presence application, or a Unified Communication (UC) application.

The network security node 806 includes a second communications interface 908, a second memory 910, and a second processor 912 communicably coupled to the second communications interface 908 and the second memory 910 wherein the second processor 912 is configured to run a network node security software 914 resident on the network security node 806. Other devices may be communicably coupled to the network security node 806, such as an authentication server or a call manager. The client-based security software 802 and the network security node 806: (a) authenticate the IP user-end device 804, and (b) authenticate a user of the IP user-end device 804 whenever a trigger condition occurs using an in-band channel between the client-based security software 802 and the network security node 806. The client-based security software 802 protects the IP user-end device 804 by screening incoming IP traffic to the IP user-end device 804. The network security node 806 protects the IP user-end device 804 by detecting an attack or a threat involving the IP user-end device 804. Various methods for authenticating and protecting the IP user-end device will be described in more detail with respect to FIGS. 10 and 11.

Figure 10:
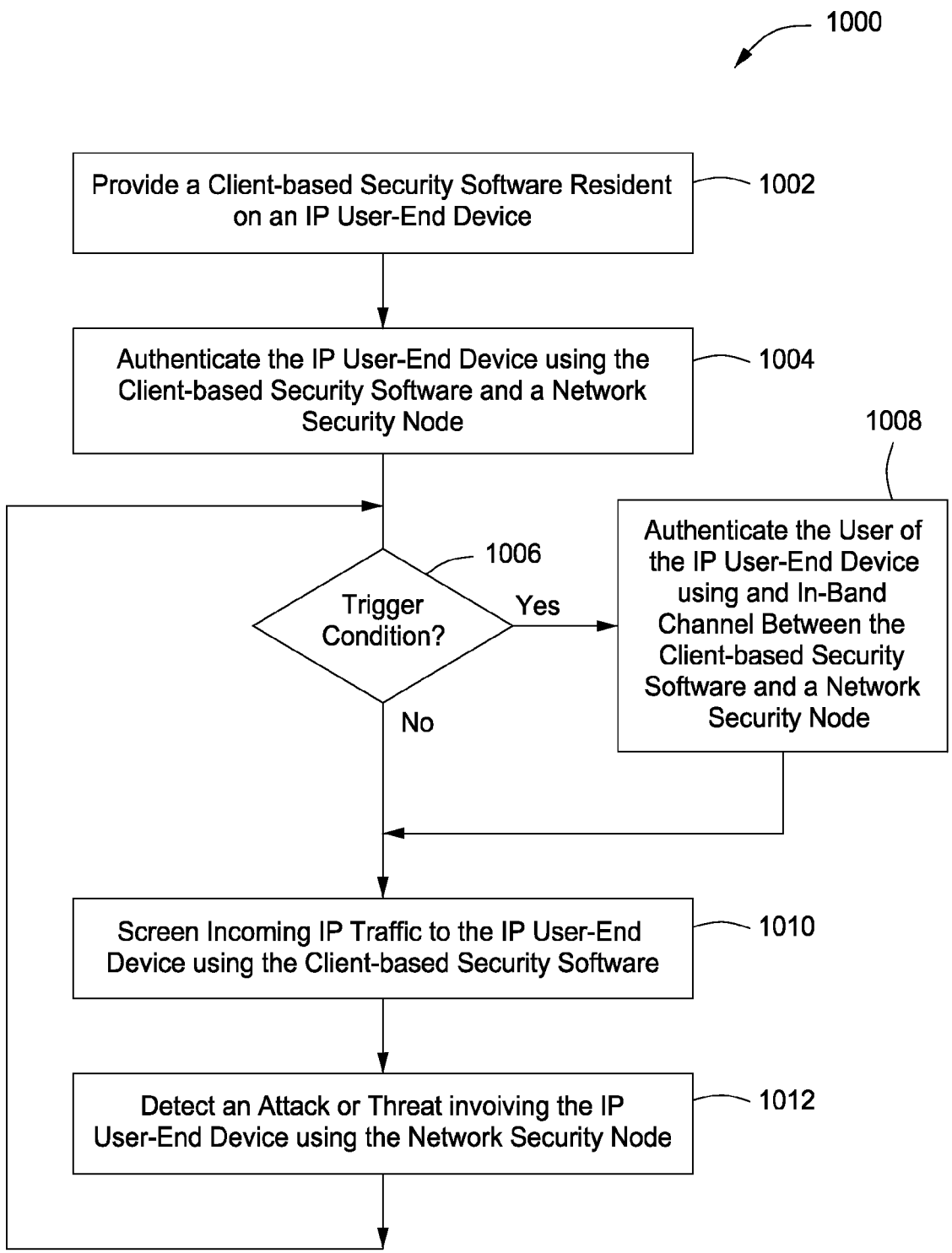
FIG. 10 is a flow chart is of a method for authenticating and protecting an IP user-end device in accordance with another embodiment of the present invention.

Referring now to FIG. 10, a flow chart 1000 of a method for authenticating and protecting an IP user-end device 804 in accordance with another embodiment of the present invention is shown. A client-based security software 802 resident on the IP user-end device 804 is provided in block 1002. The IP user-end device 804 is authenticated using the client-based security software 802 and a network security node 806 communicably coupled to the IP user-end device 804 in block 1004. The IP user-end device 804 can be authenticated using a smart card, a SIM card, a Flexi-SIM card, a security certificate stored on the smart card or the SIM card or on the UP user-end device, one or more control messages, one or more voice prompts, a "white-list", or a combination thereof. If a trigger condition occurs, as determined in decision block 1006, a user of the IP user-end device 804 is authenticated using an in-band channel between the client-based security software 802 and the network security node 806 in block 1008. The trigger condition can be a time-based condition, an event-based condition or a combination thereof.

The time-based condition can be a requirement to authenticate the user of the IP user-end device daily, weekly, bi-weekly, monthly, quarterly, yearly or some other specified time. The event-based condition can be receiving a registration request from the IP user-end device, a switch-over to standby, a challenge from an authentication manager, a request for a specified service, a request for access to a specified device, or a failure of a fingerprint match. The fingerprint match may include a change in a format, a value or an order of information in a header, wherein the header information include via, max forwards, contact, user agent, allow, proxy require, supported, route, Cseq, session expires, allow events, content length, SDP bandwidth, SDP silence suppression, SDP connection, SDP originator or SDP payload.

After the user is authenticated in block 1008, or if the trigger condition has not occurred, as determined in decision block 1006, the IP user-end device 804 is protected by screening incoming IP traffic to the IP user-end device 804 using the client-based security software 802 in block 1010, and detecting an attack or a threat involving the IP user-end device 804 using the network security node 806 in block 1012. The attack or the threat may include DoS/DDoS floods, fuzzing/malformed messages, reconnaissance attacks, spoofing attacks, MIM attacks, stealth call attacks, rogue media, anomalous behavior, and/or SPAM. The process repeats the steps of detecting the trigger condition and protecting the IP user-end device 804 as needed to authenticate and protect the IP user-end device 804. The step of authenticating the IP user-end device 804 can be repeated. Note that this process can be implemented using a computer readable medium executed by the processors wherein the steps are executed by one or more code segments.

Figure 11:
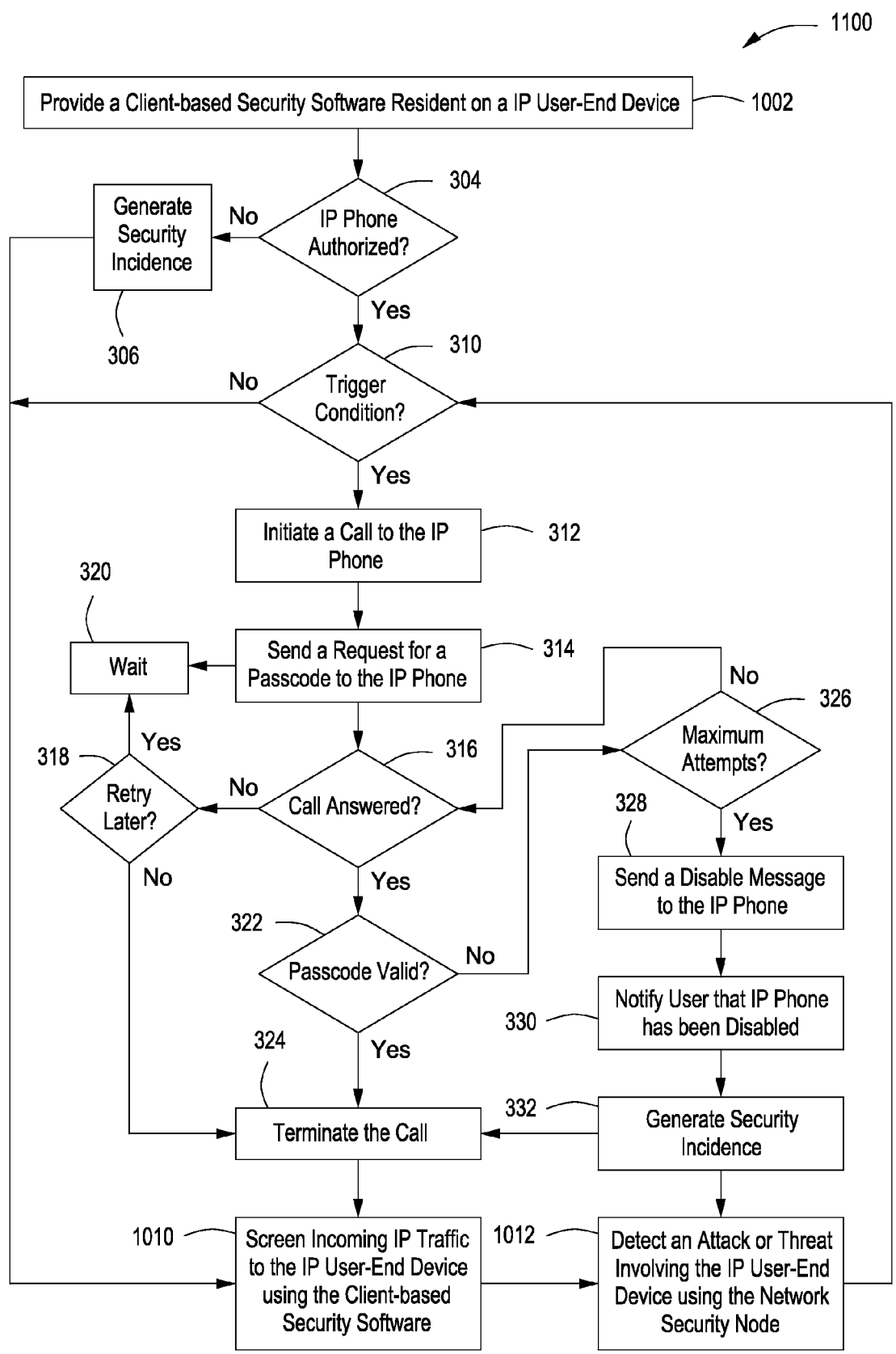
FIG. 11 is a flow chart is of a method for authenticating and protecting an IP user-end device in accordance with yet another embodiment of the present invention.

Now referring to FIG. 11, a flow chart 1100 of a method for authenticating and protecting an IP user-end device 804 in accordance with another embodiment of the present invention is shown. A client-based security software 802 resident on the IP user-end device 804 is provided in block 1002. If the IP user-end device 804 is not authorized, as determined in decision block 304, a security incidence is generated in block 306 and the process screens incoming traffic in block 1010. A "white list" or other type of commonly used device authentication can be used to authenticate the IP user-end device. If, however, the IP user-end device 804 is authorized, but a trigger condition does not occur (or is not satisfied), as determined in decision block 310, the process screens incoming traffic in block 1010. The trigger condition can be a time-based condition, an event-based condition or a combination thereof. The time-based condition can be a requirement to authenticate the IP user-end device daily, weekly, bi-weekly, monthly, quarterly, yearly or some other specified time. The event-based condition can be receiving a registration request from the IP user-end device, a switch-over to standby, a challenge from an authentication manager, a request for a specified service, or a request for access to a specified device. If, however, the trigger condition is satisfied, the network security node 806 initiates a call to the IP user-end device 804 in block 312.

After the call is initiated, the secure server 102 sends a request for the user's passcode to the IP user-end device 804 in block 314. The request for the passcode may include one or more display prompts, one or more voice prompts or a combination thereof. The passcode can be a personal identification code, a token code, a physical key, an electronic key, a biometric identifier, a magnetic signature, an electronic signature, one or more numbers, one or more symbols, one or more alphabet characters, one or more keystrokes, or a combination thereof. If the call is not answered, as determined in decision block 316, and request retries are allowed, as determined in decision block 318, the process waits in block 320 and a new request is sent in block 314. If, however, retries are not allowed, the call is terminated in block 324 and the process screens incoming traffic in block 1010. If, however, the call is answered, as determined in decision block 316, and the passcode is valid, as determined in decision block 322, the call is terminated in block 324 and the process screens incoming traffic in block 1010. If, however, the passcode is not valid, and the maximum number of attempts to enter the passcode have not been exceeded, as determined in decision block 326, the user may try to enter the correct passcode. If, however, the maximum number of attempts has been made, the network security node 806 sends a message to the IP user-end device 804 that will disable the IP user-end device 804 or reject the authentication request in block 328, the user is notified that the IP user-end device 804 has been disabled or the authentication request was rejected in block 330. The notification may include one or more display messages, audio messages, voice mail messages, electronic mail messages, text messages, or a combination thereof. Thereafter, a security incidence is generated in block 332, the call is terminated in block 324 and the process screens incoming traffic in block 1010. After the IP user-end device 804 is authenticated, the IP user-end device 804 will be allowed to access resources or connect to devices protected by the network security node 806.

The network security node 806 can block any messages from the IP user-end device 804 until the IP user-end device 804 and the user are authenticated. In addition, the network security node 806 can initiate another call to the IP user-end device 804 and send another request for a passcode to the IP user-end device 804 after the IP user-end device 804 has been disabled for a specified period of time or after the specified period of time since the authentication request from the IP user-device 804 was rejected. The network security node 806 can delay registration of the IP user-end device 804 with a call manager until the IP user-end device 804 and the user are authenticated. Moreover, the IP user-end device 804 can be enabled after the IP user-end device 804 has been disabled by using a "clearing" process executed by the user, a technician, a security person, a supervisor or a combination thereof.

After the user is authenticated in block 1008, or if the trigger condition has not occurred, as determined in decision block 1006, the IP user-end device 804 is protected by screening incoming IP traffic to the IP user-end device 804 using the client-based security software 802 in block 1010, and detecting an attack or a threat involving the IP user-end device 804 using the network security node 806 in block 1012. The process repeats the steps of detecting the trigger condition and protecting the IP user-end device 804 as needed to authenticate and protect the IP user-end device 804.

Additional steps may include receiving a request for a configuration file from the IP user-end device 804, retrieving the configuration file, sending the configuration file to the IP user-end device 804, requesting the configuration file from a call manager, receiving the requested configuration file, and saving the requested configuration file and sending a reset message to the IP user-end device 804 whenever the requested configuration file is different than the configuration file. In addition, the following steps may be performed: receiving another request for the configuration file in response to the reset message, and sending the requested configuration file to the IP user-end device 804. Note that the client-based security software 802 can split one or more resources of the IP-user-end device 804 into one or more logical access-controlled areas. Note that this process can be implemented using a computer readable medium executed by the processors wherein the steps are executed by one or more code segments.

The present invention can provide some or all of the following features:

- The client-based security software 802 will be supported on mobile phone devices (MSFT WM 6.1 OS), Nokia E and N series dual mode phones with Symbian OS, iPhone, Blackberry (SIP Client) and other phone devices that support VoIP or Unified Communication also apply.
- The client-based security software 802 acts as a control point for screening incoming traffic.
- The client-based security software 802 will enable Mutual Authentication with TLS/SRTP (for mobile phones that support TLS/SRTP).
- The network security node 806 will be deployed in the network and will provide full security functionality as well as TLS/SRTP termination, DPI, admission control and other services.
- The system will support Certificate download from SIM and/or Smart Card.
- UC-Sec IOT with Singtel, Star Hub, and M1 SIP Trunks.
- Logs, Forensics, incidences.
- Two Factor Authentication.
- Anti-Spam, black list entry via client-based security software 802.
- TLS, smart card based certificate authorization.
- SRTP via the client-based security software 802.
- Support secure messaging, secure SMS and SMS logging via client-based security software 802.
- FlexiSIM card based authentication support.
- Phone resource virtualization.
- Zeroization of cert, key, contacts, messages/logs via client-based security software 802.
- Address book with IP-contact (SIP contacts) list.
- Separation of GSM calls, IP call contacts in phone list.
- The client-based security software 802 will be supported on Soft-phone with SIP stack.
- OTP integration with FlexiSIM card will be adopted.
- System applies to any device that support VoIP or UC applications such as Video call, IM or Presence services and others.
- System compliant with the following call server(s) in the network: Asterisk, OpenSer, Alcatel (model TBD), Singtel, Star Hub, M1 SIP trunks, and other call servers that support VoIP or Unified Communication.

Other characteristics of the present invention may include:

- System will support Mutual authentication with TLS on many dual-mode phones in models where the phone supports TLS and mTLS.
- System will support Smartcard based certificate download, authentication with TLS. Reading Smartcard credentials from laptop and using these credentials for TLS session.
- TLS certificates can be transferred from the Smartcard onto the phone for example via Bluetooth interface.
- Client-based security software 802 will initiate a TLS session for VoIP calls with the network.
- Client-based security software 802 will support and initiate an SRTP session for VoIP calls with the network.
- Signaling encryption (TLS) will be applied for all users. TLS Encryption will be applied between the network security node 806 and the mobile device outside the Enterprise. The network security node 806 will decrypt the signaling traffic between the network security node 806 and the Call Server 814.
- Media encryption (SRTP) will be applied to a Specific user set. This user list will be configured at the Central EMS 824. SRTP Encryption will be applied between the network security node 806 and the client-based security software 802 outside the Enterprise. The network security node 806 will decrypt the part of the call between the network security node 806 and any end device that does not support encryption e.g. PSTN side.
- Client-based security software 802 will apply policy enforcement on the mobile device to connect only to the network security node 806.
- Client-based security software 802 will provide Anti-Spam, black list entry capability to the user.
- The system will provide security Threat protection using the network security node 806 against attacks covering: DoS/DDoS floods, Fuzzing/malformed messages, Reconnaissance attacks, Spoofing, MIM attacks, Stealth call attack, Rogue media, Anomalous behavior and SPAM
- The network security node 806 will prevent attacks from reaching the mobile end device.
- The network security node 806 will be deployed in the network and will provide full security functionality as well as TLS/SRTP termination, DPI, admission control and other services
- The network security node 806 will provide attack information details and threats history.
- The network security node 806 will support Audit capability for all mobile phones calls and activities.
- Audit logs are to be uploaded to the network security node 806 whenever connection is established. All Audit files collected will be stored on the network security node 806 then forwarded to the Central EMS 824 where there will be a much larger storage and management space.
- In cases were network security node 806 local storage memory is full, and connection to the Central EMS 824 is not available, the present invention will provide a configuration option on the network security node 806 to do one of the following 1) new audit log files will override oldest log files on the device, 2) No new audit logging will be done until memory space becomes available on the network security node 806.
- Smartcards will be chosen based on the following considerations: small form factor for easy insertion and removal from the phone, should not be cumbersome when operating the phone, and order of choice should be MicroSD followed by FlexiSIM if possible.
- The system will support using 2048-bits certificates and 256-bits symmetric key for TLS.
- The system will support secure messaging, secure SMS and SMS logging via mobile client.
- FlexiSIM card based authentication support.
- The system will support Mobile Phone resource virtualization.
- The system will support Zeroization of cert, key, contacts, messages/logs via client-based security software 802.
- Client-based security software 802 will support Address book with IP-contact (SIP contacts) list.
- Client-based security software 802 will support Separation of GSM calls, IP call contacts in phone list.

Additional aspects regarding the operation of the present invention may include the following:

Support Certificate download from Smart Card/SM card and storing them on the phone.

Support RSA 2-Factor Authentication. The client-based security software 802 will interact with network security node 806 to execute the 2-Factor Authentication.

Network owner shall have the option to configure 2-Factor Authentication to be triggered not necessarily on every call, but on a periodic basis for e.g. only once a day per user.

Network security node 806 will initiate two factor authentications on a specific user when fingerprint match fails (e.g. upon device change).

Provide means to split phone resources into logical access-controlled device/area.

Only when TLS is enabled, will the phone allow access to official contacts, personal contacts will not be enabled at this time.

Provide capability for Smart phones to initiate TLS sessions even if the phone type is not TLS capable.

Support and Integration with Flex-SIM card on the user-end device. i.e. to provide the OTP integration.

Notifications and installations of software upgrades of the client-based security software 802 are done remotely and over the network.

The User Fingerprint composition is defined during configuration and can be composed of a combination or all of the following information elements:

Via:
Max Forwards
Contact:
User Agent
Allow
Proxy Require
Supported
Route
Cseq
Session Expires
Allow Events
Content Length
SDP Bandwidth
SDP Silence Suppression
SDP Connection
SDP Originator
SDP Payload The Fingerprint mismatch Criteria will be based on the change in format, value or order of the header information. Upon fingerprint mismatch, the system can be configured to trigger a user verification in every mismatch scenario, or on a customizable fashion e.g. only if User Agent info changes. The user verification trigger and Fingerprint information are fully customizable in the present invention with default settings.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for authenticating and protecting an Internet Protocol (IP) user-end device comprising the steps of:

providing a client-based security software resident on the IP user-end device;

authenticating the IP user-end device using the client-based security software and a network security node communicably coupled to the IP user-end device;

in response to successfully authenticating the IP user-end device, authenticating a user of the IP user-end device whenever a trigger condition occurs using an in-band channel between the client-based security software and the network security node, wherein the step of authenticating the user of the IP user-end device comprises the steps of:

initiating a authenticating call from the network security node to the IP user-end device;

in response to the authenticating call being answered at the IP user-end device, sending a request for a passcode to the IP user-end device, wherein the request prompts the user of the IP user-end device to enter a passcode;

sending to the IP user-end device a message to disable the IP user-end device when the passcode is invalid; and after determining whether the passcode is valid or invalid, terminating the authenticating call; and protecting the IP user-end device by: (a) screening incoming IP traffic to the IP user-end device using the client-based security software, and (b) detecting an attack or a threat involving the IP user-end device using the network security node.

2. The method as recited in claim 1, wherein:

the step of authenticating the IP user-end device uses a smart card, a subscriber identity module (SIM) card, a Flexi-SIM card, a security certificate stored on the smart card or the SIM card or on the IP user-end device, one or more control messages, one or more voice prompts, a "white-list", or a combination thereof;

the IP user-end device comprises a dual mode phone, a wireless phone, a soft phone, a web phone, a personal data assistant, a computer, or other IP-based telecommunications device; and the IP user-end device runs an IP-based application comprising a Voice over IP (VoIP) application, an Instant Messaging (IM) application, a Short Message Service (SMS) application, a video application, a presence application, or a Unified Communication (UC) application.

3. The method as recited in claim 1, wherein:
the trigger condition comprises a time-based condition, an event-based condition or a combination thereof;
the time-based condition comprises a requirement to authenticate the user of the IP user-end device daily, weekly, bi-weekly, monthly, quarterly, yearly or some other specified time; and
the event-based condition comprises receiving a registration request from the IP user-end device, a switch-over to standby, a challenge from an authentication manager, a request for a specified service, a request for access to a specified device, or a failure of a fingerprint match.

4. The method as recited in claim 3, wherein:
the fingerprint match comprises a change in a format, a value or an order of information in a header; and
the header information comprises via, max forwards, contact, user agent, allow, proxy require, supported, route, command sequence (Cseq), session expires, allow events, content length, session description protocol (SDP) bandwidth, SDP silence suppression, SDP connection, SDP originator or SDP payload.

5. The method as recited in claim 1, wherein the attack or the threat comprises denial of service/distributed denial of service (DoS/DDoS) floods, fuzzing/malformed messages, reconnaissance attacks, spoofing attacks, man in the middle (MIM) attacks, stealth call attacks, rogue media, anomalous behavior, and/or spam.

6. The method as recited in claim 1, further comprising the step of generating a security incidence whenever the authentication of the IP user-end device fails.

7. The method as recited in claim 1, further comprising the step of blocking any messages from the IP user-end device until the IP user-end device and the user are authenticated.

8. The method as recited in claim 1, wherein:
the request for the passcode comprises one or more display prompts, one or more voice prompts or a combination thereof; and
the passcode comprises a personal identification code, a token code, a physical key, an electronic key, a biometric identifier, a magnetic signature, an electronic signature, one or more numbers, one or more symbols, one or more alphabet characters, one or more keystrokes, or a combination thereof.

9. The method as recited in claim 1, further comprising the step of resending the request for the passcode after a specified period of time whenever the user does not answer the call.

10. The method as recited in claim 1, wherein the step of sending the message to disable the IP user-end device or rejecting the authentication request from the IP user-end device is performed after a specified number of consecutive of authentication attempts have failed.

11. The method as recited in claim 1, further comprising the step of notifying the user that the IP user-end device has been disabled or the authentication request from the IP user-device has been rejected using one or more display messages, audio messages, voice mail messages, electronic mail messages, text messages, or a combination thereof.

12. The method as recited in claim 1, further comprising the steps of initiating another call to the IP user-end device and sending another request for a passcode to the IP user-end device after the IP user-end device has been disabled for a specified period of time or after the specified period of time since the authentication request from the IP user-device was rejected.

13. The method as recited in claim 1, further comprising the step of enabling the IP user-end device after the IP user-end device has been disabled using a "clearing" process executed by the user, a technician, a security person, a supervisor or a combination thereof.

14. The method as recited in claim 1, further comprising the step of requesting authentication of the received passcode from an authentication server.

15. The method as recited in claim 1, further comprising the step of delaying registration of the IP user-end device with a call manager until the IP user-end device and the user are authenticated.

16. The method as recited in claim 1, further comprising the steps of:
receiving a request for a configuration file from the IP user-end device;
retrieving the configuration file;
sending the configuration file to the IP user-end device;
requesting the configuration file from a call manager;
receiving the requested configuration file; and
saving the requested configuration file and sending a reset message to the IP user-end device whenever the requested configuration file is different than the configuration file.

17. The method as recited in claim 16, further comprising the steps of:
receiving another request for the configuration file in response to the reset message; and
sending the requested configuration file to the IP user-end device.

18. The method as recited in claim 1, wherein the client-based security software splits one or more resources of the IP-user-end device into one or more logical access-controlled areas.

19. An apparatus for authenticating and protecting an Internet Protocol (IP) user-end device comprising:
a communications interface;
a memory; and
a processor communicably coupled to the communications interface and the memory wherein the processor is configured to run a client-based security software resident on the IP user-end device;
wherein the client-based security software and a network security node are communicably coupled to the IP user-end device and are operable to: (a) authenticate the IP user-end device, and (b) in response to successfully authenticating the IP user-end device, authenticate a user of the IP user-end device whenever a trigger condition occurs using an in-band channel between the client-based security software and the network security node, wherein the step of authenticating the user of the IP user-end device comprises the steps of:
initiating a authenticating call from the network security node to the IP user-end device;
in response to the authenticating call being answered at the IP user-end device, sending a request for a passcode to the IP user-end device, wherein the request prompts the user of the IP user-end device to enter a passcode;
sending to the IP user-end device a message to disable the IP user-end device when the passcode is invalid; and
after determining whether the passcode is valid or invalid, terminating the authenticating call;
wherein client-based security software protects the IP user-end device by screening incoming IP traffic to the IP user-end device; and wherein the network security node protects the IP user-end device by detecting an attack or a threat involving the IP user-end device.

20. A system comprising:

one or more Internet Protocol (IP) user-end devices, each IP end-user device comprising a first communications interface, a first memory, and a first processor communicably coupled to the first communications interface and the first memory wherein the first processor is configured to run a client-based security software resident on the IP user-end device;

a network security node comprising a second communications interface, a second memory, and a second processor communicably coupled to the second communications interface and the second memory;

an IP network communicably coupling the one or more IP user-end devices to the network security node;

wherein the client-based security software and the network security node: (a) authenticate the IP user-end device, and (b) in response to successfully authenticating the IP user-end device, authenticate a user of the IP user-end device whenever a trigger condition occurs using an in-band channel between the client-based security software and the network security node, wherein the step of authenticating the user of the IP user-end device comprises the steps of:

initiating a authenticating call from the network security node to the IP user-end device;

in response to the authenticating call being answered at the IP user-end device, sending a request for a passcode to the IP user-end device, wherein the request prompts the user of the IP user-end device to enter a passcode;

sending to the IP user-end device a message to disable the IP user-end device when the passcode is invalid; and after determining whether the passcode is valid or invalid, terminating the authenticating call;

wherein client-based security software protects the IP user-end device by screening incoming IP traffic to the IP user-end device; and wherein the network security node protects the IP user-end device by detecting an attack or a threat involving the IP user-end device.

21. The system as recited in claim 20, further comprising an authentication server communicably coupled to the network security node.

22. The system as recited in claim 20, further comprising a call manager communicably coupled to the network security node.

* * * * *